US012782993B2

(12) United States Patent
Mustafazade

(10) Patent No.: US 12,782,993 B2
(45) Date of Patent: Nov. 3, 2026

(54) ELECTRICAL CONSTANT CURRENT CIRCUIT, ELECTRICAL CONSTANT CURRENT SOURCE, MEASUREMENT ARRANGEMENT

(71) Applicant: SIEMENS INDUSTRY SOFTWARE NV, Leuven (BE)

(72) Inventor: Arif Mustafazade, Breda (NL)

(73) Assignee: Siemens Industry Software NV, Leuven (BE)

( * ) Notice: Subject to any disclaimer, the term of this patent is extended or adjusted under 35 U.S.C. 154(b) by 0 days.

(21) Appl. No.: 19/153,702

(22) PCT Filed: Jan. 10, 2024

(86) PCT No.: PCT/EP2024/050465
§ 371 (c)(1),
(2) Date: Aug. 5, 2025

(87) PCT Pub. No.: WO2024/165256
PCT Pub. Date: Aug. 15, 2024

(65) Prior Publication Data

US 2026/0111051 A1 Apr. 23, 2026

(30) Foreign Application Priority Data

Feb. 6, 2023 (EP) .................................... 23155022

(51) Int. Cl.
*G05F 3/22* (2006.01)
*G05F 3/26* (2006.01)

(52) U.S. Cl.
CPC .............. *G05F 3/222* (2013.01); *G05F 3/265* (2013.01)

(58) Field of Classification Search
CPC . G05F 3/222; G05F 3/265; G05F 3/22; G05F 3/227; G05F 3/20; G05F 3/24;
(Continued)

(56) References Cited

U.S. PATENT DOCUMENTS 2,822,434 A * 2/1958 Ehret ...................... H03F 1/302 330/290
3,784,844 A 1/1974 Mcgrogan

FOREIGN PATENT DOCUMENTS

DE 3539848 A1 5/1987

OTHER PUBLICATIONS

Analog Devices, "1.2 V Micropower, Precision Shunt Voltage Reference AD1580" Jan. 2011. pp. 1-12.

(Continued)

*Primary Examiner* — Jung Kim
(74) *Attorney, Agent, or Firm* — Lempia Summerfield Katz LLC

(57) ABSTRACT

An electrical constant current circuit (CCC) in particular for supplying electrical power to a sensor, the circuit (CCC) including a power supply input terminal (INT), a constant current output terminal (OUT), a first transistor (TRF), and a shunt-type voltage reference (RVS), wherein the base of the first transistor (TRF) is biased by the shunt-type voltage reference (SVR) in series with the base-emitter junction of the second transistor (TRS), wherein the emitter of the first transistor (TRF) is connected to the power supply input terminal (INT) via a current set resistor (RST), wherein the collector of the first transistor (TRF) is connected to the output terminal (OUT) through a Schottky diode (SKD). For the improved temperature stability, initial accuracy, drop out voltage and power consumption embodiment provides that the circuit (CCC) includes a second transistor (TRS) in the line between the base of the first transistor (TRF) and the shunt-type voltage reference (SVR), wherein the second transistor's (TRS) base and collector are connected to the first transistor's (TRF) base.

5 Claims, 2 Drawing Sheets

(58) Field of Classification Search
CPC ... G05F 3/247; G05F 1/10; G05F 1/46; G05F 1/613; G05F 1/66; G05F 3/02; G05F 3/08; G05F 3/10; G11C 5/147
See application file for complete search history.

(56) References Cited

OTHER PUBLICATIONS

International Preliminary Report on Patentability for International App. No. PCT/EP2024/050465 mailed Jan. 29, 2025.
International Search Report for International App. No. PCT/EP2024/050465 mailed Apr. 15, 2024.
Tony R Kuphaldt: "Lessons in Electric Circuits—vol. III Semiconductors—Chapter 4", Feb. 17, 2003 (Feb. 17, 2003), XP055308311. pp. 1-77.Retrieved: https://www.ibiblio.org/kuphaldt/electricCircuits/Semi/SEMI_4.html.
Wikipedia, "Schottky diode" pp. 1-6. https://en.wikipedia.org/wiki/Schottky_diode# :~: text=Schottky)%2C%20also% 20known%20as%20Schottky,a%20very%20fast%20switching%20action.
Needs cited: Linden T. Harrison, "Current Sources and Voltage References", 2005, Chapter 4—Using BJTs to Create Current Sources, pp. 47-124, and Chapter 5—Using Precision Matched-Pairs, Duals, and Quads, pp. 125-135, 2005.

* cited by examiner

ELECTRICAL CONSTANT CURRENT CIRCUIT, ELECTRICAL CONSTANT CURRENT SOURCE, MEASUREMENT ARRANGEMENT

CROSS REFERENCE TO RELATED APPLICATIONS

The present patent document is a § 371 nationalization of PCT Application Serial Number PCT/EP2024/050465, filed Jan. 10, 2024, designating the United States which is hereby incorporated in its entirety by reference. This patent document also claims the benefit of EP 23155022.9 filed on Feb. 6, 2023, which is hereby incorporated in its entirety by reference.

FIELD

Embodiments relate to an electrical constant current circuit, the circuit including a power supply input terminal, a constant current output terminal, a first transistor, a shunt-type voltage reference, wherein the base of the first transistor is biased by the shunt-type voltage reference in series with the base-emitter junction of the second transistor, wherein the emitter of the first transistor is connected to the power supply input terminal via a current set resistor, wherein the collector of the first transistor is connected to the output terminal through a Schottky diode.

BACKGROUND

From "Linden T. Harrison, Current Sources and Voltage References", 2005, Chapter 4-Using BJTs to Create Current Sources, Pages 47-124, and Chapter 5-Using Precision Matched-Pairs, Duals, and Quads, Pages 125-135, 2005 design suggestions about approaches of constant current circuits are known.

From U.S. Pat. No. 3,784,844 A an electrical constant current circuit of the incipiently mentioned type is known. The arrangement includes an individual diode which will compensate the drifts to some degree but will have much higher accuracy uncertainties and higher thermal drifts due to the unequal thermal behavior and thermal condition of the diode with respect to the base-emitter junction of the transistor.

Conventional constant current circuits, e.g., the traditional Zener diode-based circuit, suffer from a high drop-out voltage. The Zener diode-based circuit is limited to the voltage of available precision Zener diodes and increasing thermal drift of the circuit with lower voltage Zener diodes. The drop-out voltage of the traditional circuit is relatively high because of the voltage of the available precision Zener diodes. Lower voltage Zener diodes are available but with high tolerances which makes the overall circuit tolerance not suitable for precision applications. An increased dropout voltage requires higher supply voltage and causes higher dissipated power in the circuit. Further, the thermal drift behavior and the initial accuracy of the Zener diode-based circuit are poor due to the limited tolerances of available Zener diodes and the large tolerances of the junction voltage of the transistor which normally has big variations.

In sensor applications where a minimum output current should be guaranteed over the full operation temperature range of the system (e.g. ICP®-acceleration sensors by PCB SYNOTECH GMBH), the nominal output current should be set to higher values which results in higher dissipated power and higher consumed power.

Integrated Circuit (IC) current sources are available but their maximum voltage ratings are limited and do not meet the requirements for most of the industrial applications.

Currently, an improved solution avoiding these drawbacks is not available.

BRIEF SUMMARY AND DESCRIPTION

The scope of the embodiments is defined solely by the appended claims and is not affected to any degree by the statements within this summary. The present embodiments may obviate one or more of the drawbacks or limitations in the related art.

Embodiments diminish the above explained drawbacks and improve initial accuracy and/or reduce the operating power consumption and/or reduce the temperature drift and/or to lower the drop out voltage.

Embodiments provide a circuit that is prepared such that the circuit includes a second transistor in the line between the first transistor's base and the shunt-type voltage reference, wherein the second transistor's base and collector are connected to the first transistor's base.

An embodiment provides that a capacitor is provided parallel to the shunt-type voltage reference in series with the second transistor to reduce noise. This feature enables a more stable constant current.

Another embodiment provides that the circuit includes a ground reference of the shunt type voltage reference via a grounding bias resistor. In other words and in more detail that means that the circuit includes a ground reference of the shunt-type voltage reference connected to the ground of the input voltage source via base-emitter junction of the second transistor in series with a grounding bias resistor the grounding bias resistor belonging to the constant current circuit, the grounding bias resistor, which embodies the ground reference of the shunt voltage reference, is an integral part of the constant current circuit. In other words, the shunt-type voltage reference includes a ground reference terminal, wherein the terminal is connected to a ground terminal via the grounding bias resistor.

The voltage reference may be a micropower precision shunt-type voltage reference. This may be e.g., an AD1580 (available at Analog Devices, Inc.) 2-terminal precision band gap shunt-type voltage reference. The AD1580 provides a 1.225 V output for input currents between 50 μA and 10 mA. The initial voltage accuracy is ±0.1% and the temperature drift is ±50 ppm/° *C. maximum*. The operating range lies between 50 u A to 10 mA.

The term "micropower" is a common term in electronics meaning that the consumed power is in the range of microwatts.

An embodiment provides a Schottky diode at the output terminal to avoid reverse current for output protection. Employing the Schottky diode reduces the drop-out voltage of the circuit by about 0.3 V compared to using a normal rectifier diode.

The first transistor and the second transistor are identical. The first transistor and the second transistor may both be part of a matched-pair dual transistor. This matched-pair dual transistor may e.g., be a DMMT5401-7-F bipolar transistor BJT matched PNP SM signal trans of Diodes Incorporated.

Another embodiment provides an electrical constant current source, the source including a constant current circuit as described herein wherein the source includes a power supply, supplying power to the constant current circuit.

One field of application is a measurement arrangement including a constant current source according to one of the herein described embodiments.

According to the embodiments described herein, a circuit with two identical transistors that are parts of a matched-pair PNP transistor is employed, resulting in significant improvement in thermal drift and accuracy of the circuit due to the perfectly matched junction voltage, thermal behavior, and also thermally coupled structure of the matched-pair transistor.

DETAILED DESCRIPTION

Figure 1:
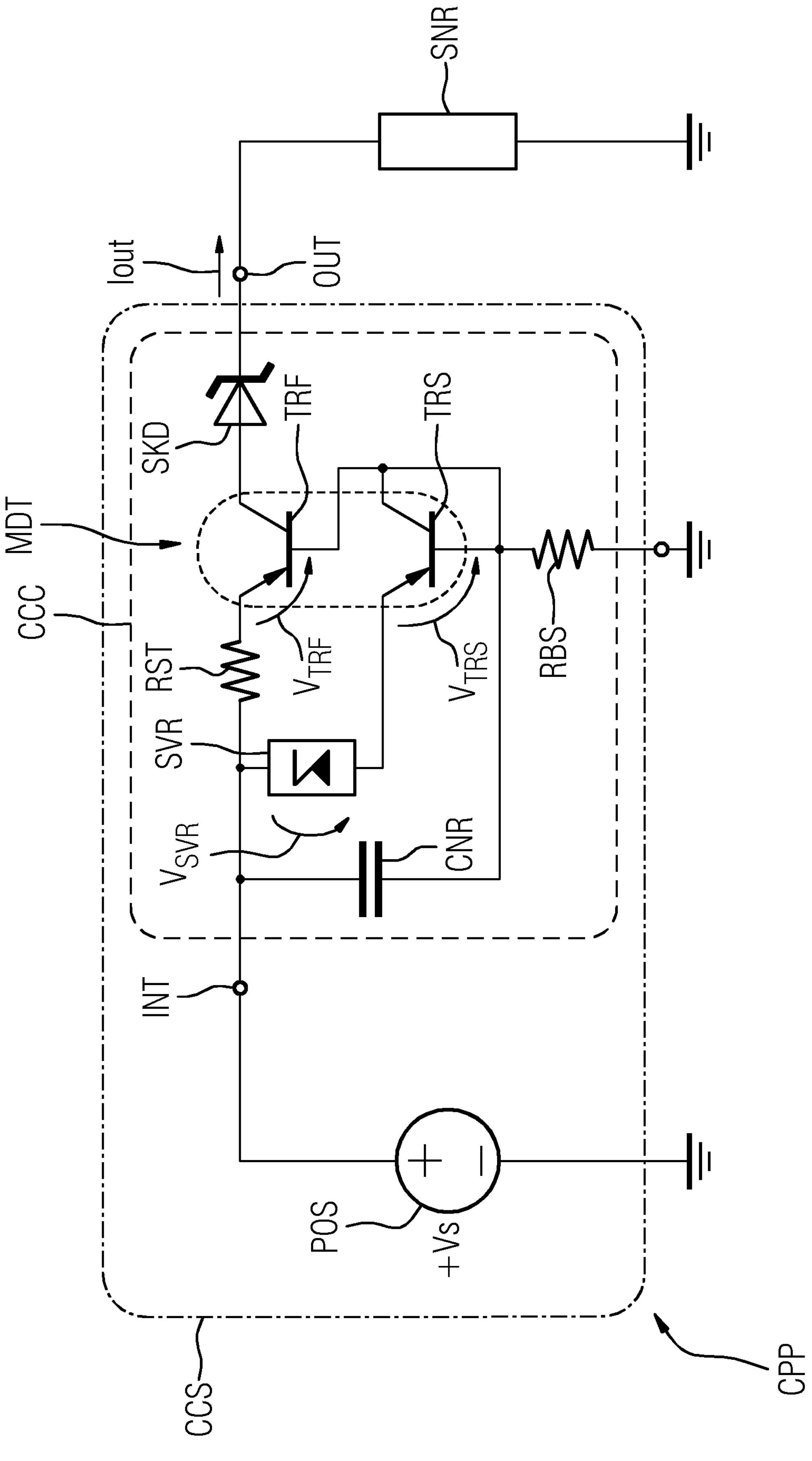
FIG. 1 depicts a schematic diagram of an electrical constant current source including a constant current circuit according to an embodiment.

FIG. 1 depicts a schematic diagram of an electrical constant current source CCS including a constant current circuit CCC. The constant current circuit CCC for supplying electrical power to a sensor SNR receives the operation power from a (for example regulated) DC power supply POS.

The circuit CCC includes a power supply input terminal INT and a constant current output terminal OUT. A first transistor TRF and an identical second transistor TRS are provided as a matched-pair dual transistor MDT. The transistors are configured such that the first transistor's TRF emitter is connected to the power supply input terminal INT via a-current set resistor RST; the first transistor's TRF base is biased by the shunt-type voltage reference SVR via the second transistors emitter-base-line (base-emitter junction); the second transistor's TRS base is connected to its collector and to the first transistor's TRF base; the first transistor's TRF collector is connected to the output terminal OUT via a Schottky diode SKD, and an optional noise reduction capacitor CNR connected in parallel to the shunt-type voltage reference SVR in series with the base-emitter junction of the second transistor TRS.

In the circuit CCC, the transistor TRF is the main pass element and equates the voltage across the reference voltage SVR plus the base-emitter voltage of the second transistor TRS to the voltage across the current set resistor RST and its base-emitter voltage VTRF such that:

$$VSVR + VTRS = VRST + VTRF$$

Employing the matched-pair dual transistor MDT perfectly cancels out VTRS and VTRF and their drifts due to the ambient temperature variations and self-heating of the transistor. This mechanism results in significant improvement on temperature drift and the accuracy of the circuit. Due to the cancellation of the VTRS by VTRF, and neglecting the base currents inequality of transistors (<50 μA), the output [Iout] current is:

$$Iout = \frac{V_{SVR} + (V_{TRF} - V_{TRS})}{R_{ST}} \cong \frac{V_{SVR}}{R_{ST}}$$

The drop-out voltage [VDO] of the circuit is: VDO=VSVR+VTRF CEsat+VSKD where the VTRF CEsat is the collector-emitter saturation voltage of the TRF and VF is the forward voltage of the diode SKD. The optional capacitor CNR is used for noise reduction and power supply rejection ratio [PSRR] improvement in high frequencies.

FIG. 1 depicts a schematic diagram of an embodiment.

Figure 2:
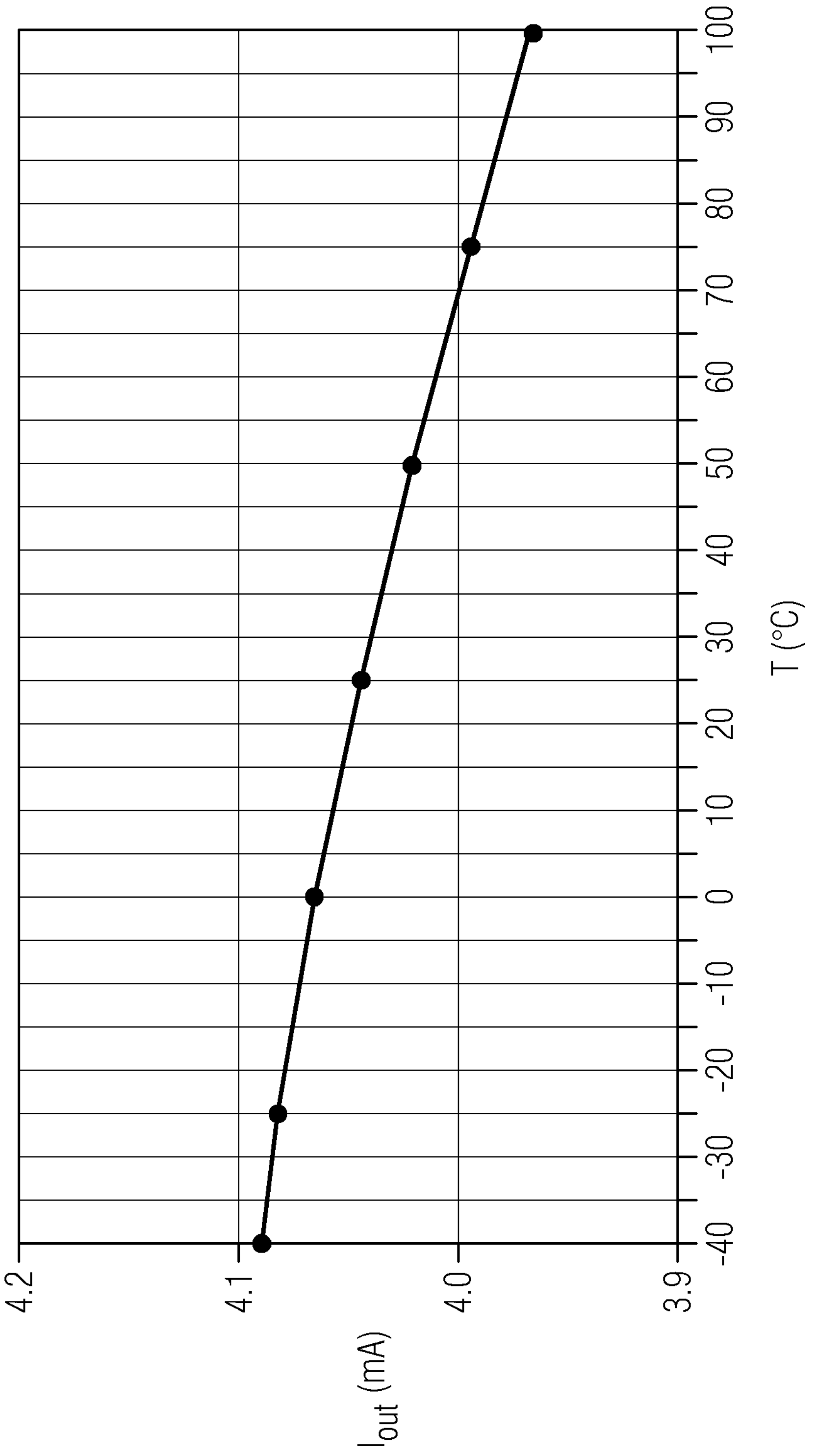
FIG. 2 depicts a measured temperature stability of the circuit in the temperature chamber according to an embodiment.

FIG. 2 depicts the measured temperature stability in the temperature chamber. Over a wide range of −40° C. to 100° C. the temperature drift is about 3.96 mA-4.09 mA which is approximately ±1.5% (this result is achieved with a ±50 ppm/° C. set resistor (Rset), further improvement possible by choosing a lower thermal coefficient resistor).

It is to be understood that the elements and features recited in the appended claims may be combined in different ways to produce new claims that likewise fall within the scope of the present description. Thus, whereas the dependent claims depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present description has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description. Independent of the grammatical term usage, individuals with male, female or other gender identities are included within the term.

The invention claimed is:

1. An electrical constant current circuit for supplying electrical power to a sensor, the circuit comprising:

a power supply input terminal;

a constant current output terminal;

a first transistor; and a shunt-type voltage reference;

wherein a base of the first transistor is biased by the shunt-type voltage reference in series with a base-emitter junction of a second transistor, wherein the first transistor emitter is connected to the power supply input terminal via a collector resistor, wherein a collector of the first transistor is connected to the constant current output terminal, and wherein the circuit comprises the second transistor in a line between the base of the first transistor and the shunt-type voltage reference, wherein a base of the second transistor and a collector of the second transistor are connected to the base of the first transistor, wherein the first transistor and the second transistor are identical, wherein the first transistor and the second transistor are both part of a matched-pair dual transistor, wherein a capacitor is connected in parallel to the series connection of the shunt type voltage reference and the diode-connected second transistor.

2. The circuit of claim 1, wherein the shunt-type voltage reference is a micropower precision shunt-type voltage reference with a power consumption in a range of microwatts.

3. The circuit of claim 1, wherein a Schottky diode is provided at the constant current output terminal to avoid reverse current.

4. The circuit of claim 1, further comprising:

a ground reference of the shunt-type voltage reference connected to a ground of a power supply via the base-emitter junction of the second transistor in series with a grounding bias resistor.

5. An electrical constant current source, the electrical constant current source comprising:

a constant current circuit comprising:

a power supply input terminal;

a constant current output terminal;

a first transistor;

a shunt-type voltage reference;

wherein a base of the first transistor is biased by the shunt-type voltage reference in series with a base-emitter junction of a second transistor, wherein an emitter of the first transistor is connected to the power supply input terminal via a collector resistor, wherein a collector of the first transistor is connected to the constant current output terminal, and wherein the circuit comprises the second transistor in a line between the based of the first transistor and the shunt-type voltage reference, wherein a base of the second transistor and collector are connected to the base of the first transistor, wherein the first transistor and the second transistor are identical, wherein the first transistor and the second transistor are both part of a matched-pair dual transistor; and a power supply, supplying power to the constant current circuit.

* * * * *